(12) United States Patent
Varns et al.

(10) Patent No.: US 8,662,226 B2
(45) Date of Patent: Mar. 4, 2014

(54) APPARATUS FOR HEATING A VEHICLE CABIN

(75) Inventors: Michael Howard Varns, Farmington, MI (US); Marc Jonathon Lucas, Novi, MI (US); Christopher Adam Ochocinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 12/796,250

(22) Filed: Jun. 8, 2010

(65) Prior Publication Data

US 2011/0298241 A1    Dec. 8, 2011

(51) Int. Cl.
  *B60K 1/04* (2006.01)
  *B60K 11/06* (2006.01)

(52) U.S. Cl.
  USPC .......................................... 180/68.5; 135/42

(58) Field of Classification Search
  USPC ........... 180/68.5; 165/61, 42, 43; 237/12.3 A; 454/159, 160; 62/259.2
  See application file for complete search history.

(56) References Cited

U.S. PATENT DOCUMENTS

| | | | | |
|---|---|---|---|---|
| 4,335,429 A | * | 6/1982 | Kawakatsu | 701/102 |
| 5,490,572 A | * | 2/1996 | Tajiri et al. | 180/65.1 |
| 5,647,534 A | | 7/1997 | Kelz et al. | |
| 5,725,048 A | | 3/1998 | Burk et al. | |
| 5,834,132 A | * | 11/1998 | Hasegawa et al. | 429/62 |
| 6,021,862 A | | 2/2000 | Sharan | |
| 6,059,016 A | * | 5/2000 | Rafalovich et al. | 165/41 |
| 6,094,927 A | * | 8/2000 | Anazawa et al. | 62/239 |
| 6,188,574 B1 | * | 2/2001 | Anazawa | 361/695 |
| 6,209,331 B1 | | 4/2001 | Lake et al. | |
| 6,575,258 B1 | | 6/2003 | Clemmer | |
| 7,147,071 B2 | * | 12/2006 | Gering et al. | 237/12.3 B |
| 7,451,608 B2 | * | 11/2008 | Kikuchi | 62/186 |
| 7,900,727 B2 | * | 3/2011 | Shinmura | 180/68.1 |
| 2005/0167169 A1 | * | 8/2005 | Gering et al. | 180/65.2 |

(Continued)

FOREIGN PATENT DOCUMENTS

WO  WO 2007/043341  *  4/2007  ............. B60L 15/00

OTHER PUBLICATIONS

"Heat storage technology update," Automotive Engineering, Feb. 1993, 3 pages.

(Continued)

*Primary Examiner* — Frank Vanaman
(74) *Attorney, Agent, or Firm* — David B. Kelley; Brooks Kushman P.C.

(57) ABSTRACT

A vehicle includes a cabin, a high voltage traction battery, an electric motor powered by the traction battery, and a charger connected to the traction battery. The charger converts alternating current (AC) to high voltage direct current (DC) to charge the traction battery when the charger is plugged into an alternating current (AC) power supply. A forced air system includes an air inlet duct, a first air outlet duct directing exhaust air to the outside of the cabin, a second air outlet duct directing exhaust air to the inside of the cabin, a fan, and a valve for controlling air flow through the first and second air outlet ducts. The forced air system is arranged such that forced air flows through the air inlet duct, removes heat from the charger, and flows through at least one of the first and second air outlet ducts to assist with vehicle preconditioning.

6 Claims, 3 Drawing Sheets

(56) References Cited

U.S. PATENT DOCUMENTS

2008/0066476 A1   3/2008  Zhu et al.
2008/0139102 A1*  6/2008  Major ............................ 454/139
2008/0179040 A1   7/2008  Rosenbaum
2008/0219866 A1   9/2008  Kwong et al.
2009/0260905 A1* 10/2009  Shinmura ..................... 180/68.1

OTHER PUBLICATIONS

Zhang et al., "Studies of air-flow and temperature fields inside a passenger compartment for improving thermal comfort and saving energy. Part II: Simulation results and discussion", Applied Thermal Engineering, 29, 2009, pp. 2028-2036.

* cited by examiner

APPARATUS FOR HEATING A VEHICLE CABIN

BACKGROUND

1. Technical Field

The invention relates to a battery electric vehicle including a high voltage traction battery and electric powertrain. The invention further relates to a plug-in hybrid electric vehicle of the type including an internal combustion engine, a high voltage traction battery, and a hybrid electric powertrain.

2. Background Art

In a battery electric vehicle, the vehicle may be plugged-in to an electrical supply to charge the high voltage traction battery. The vehicle includes a charger to convert household or industrial power supply alternating current (AC) to high voltage (HV) direct current (DC) to charge the high voltage battery.

In an existing hybrid electric vehicle, a hybrid electric vehicle powertrain includes a vehicle system controller (VSC), an internal combustion engine, a traction battery, and a transmission including a motor-generator subsystem. These components form a powersplit powertrain, and the VSC may control the components in an attempt to maximize fuel economy. In a plug-in hybrid electric vehicle, the vehicle may be plugged-in to an electrical power supply to charge the high voltage traction battery. Similar to a battery electric vehicle, the plug-in hybrid electric vehicle includes a charger to convert household or industrial power supply alternating current (AC) to high voltage (HV) direct current (DC) to charge the high voltage battery.

The vehicle-included chargers for battery and plug-in hybrid electric vehicles are either air cooled or liquid cooled. For air cooled devices, forced air, typically via a fan, flows through an inlet duct or opening and across the cooling fins of the charger. The air is warmed as it removes heat from the charger and typically exhausted outside the vehicle via body mounted extractors. External make-up air enters the cabin through natural leakage paths or via the heating ventilating and air conditioning (HVAC) unit.

When an occupant enters the vehicle during cold external ambient temperatures, the cabin is typically cool. Preconditioning allows the driver to warm up the cabin to a more comfortable temperature before they enter. Preconditioning, in a battery electric vehicle, uses energy from the high voltage battery to power a positive temperature coefficient (PTC) heater. In the case of a plug-in hybrid electric vehicle, the engine might also be turned on and heat drawn from a more conventional type of engine cooling system.

SUMMARY

It is an object of the invention to provide heat preconditioning to the cabin or high voltage battery cells, utilizing waste air from cooling the charger.

In one embodiment of the invention, a vehicle includes a cabin. The vehicle comprises a high voltage traction battery, an electric motor powered by the traction battery, and a charger connected to the traction battery. The charger converts alternating current (AC) to high voltage direct current (DC) to charge the traction battery when the charger is plugged into an alternating current (AC) power supply. The vehicle further comprises a forced air system. The forced air system includes an air inlet duct, a first air outlet duct directing exhaust air to the outside of the cabin, a second air outlet duct directing exhaust air to the inside of the cabin, a fan, and a valve for controlling air flow through the first and second air outlet ducts. The forced air system is arranged such that forced air flows through the air inlet duct, removes heat from the charger, and flows through at least one of the first and second air outlet ducts.

The valve may be arranged, for example, as a flap or door, to selectively flow forced air through a selected one of the first and second air outlet ducts depending upon cabin temperature and/or vehicle control strategy.

It is appreciated that the forced air system may be implemented in a variety of ways. The forced air system may further include a battery inlet duct located to direct warm cabin air after mixing with warm charger air from the inside of the cabin to the traction battery for warming the traction battery cells. In an alternative, the forced air system may include a charger exhaust duct located to direct exhaust air from the charger directly to the traction battery for warming the traction battery cells. The traction battery and the charger may be located, within the vehicle, behind a (second or last row) vehicle seat. However, it is appreciated that other locations are possible.

In another embodiment of the invention, a vehicle includes a cabin. The vehicle comprises a high voltage traction battery, an electric motor powered by the traction battery, and a charger connected to the traction battery. The charger converts alternating current (AC) to high voltage direct current (DC) to charge the traction battery when the charger is plugged into an alternating current (AC) power supply. The vehicle further comprises a forced air system. The forced air system includes a first air duct providing flow communication between the trunk area and the charger, a second air duct providing flow communication between the charger and the inside of the cabin, and a fan arrangement.

The forced air system is arranged such that when operating in a first mode, air flows from the outside of the cabin through the first air duct, removes heat from the charger, and flows to the inside of the cabin through the second air duct. When operating in the second mode, air flows from the inside of the cabin through the second air duct, removes heat from the charger, and flows to the outside of the cabin through the first air duct.

It is appreciated that the forced air system may be implemented in a variety of ways. In one approach, the forced air system further includes a battery inlet duct located to direct warm cabin air (after mixing with warm charger air) from the inside of the cabin to the traction battery for warming the traction battery cells. In an alternative, the forced air system further includes a charger exhaust duct located to direct exhaust air from the charger directly to the traction battery for warming the traction battery cells.

The fan arrangement, in one possible implementation, includes a first fan and a second fan. The first fan is positioned to provide air flow from the trunk area through the first air duct and to the inside of the cabin through the second air duct. The second fan is positioned to provide air flow from the inside of the cabin through the second air duct.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention comprehends using the exhaust air from the charger to warm the interior cabin and/or high voltage batteries for preconditioning purposes. In one implementation, a split exhaust duct is used, with a valve or flap which would direct the warm charger exhaust air in numerous directions. In more detail, warm charger exhaust air is directed outside the vehicle via body vehicle extractors when warm external ambient temperatures are evident and the cabin is already hot. This prevents interior cabin air from increasing in temperature through mixing with the charger exhaust air and encourages air flow within the cabin. Warmed charger exhaust air is directed into the cabin during colder ambient temperatures to warm the interior air temperature. Waste heat from the charger is recycled and ducted into the cabin providing "free" warm air to the cabin. This would be used as part of a preconditioning strategy during vehicle charging.

Warm charger exhaust air may also be directed into the high voltage battery to heat the cells and overcome some of the efficiency issues associated with cold battery cells. Warm air could be ducted directly into the battery or battery ducts or the battery fan could draw warm air from the cabin.

Figure 1:
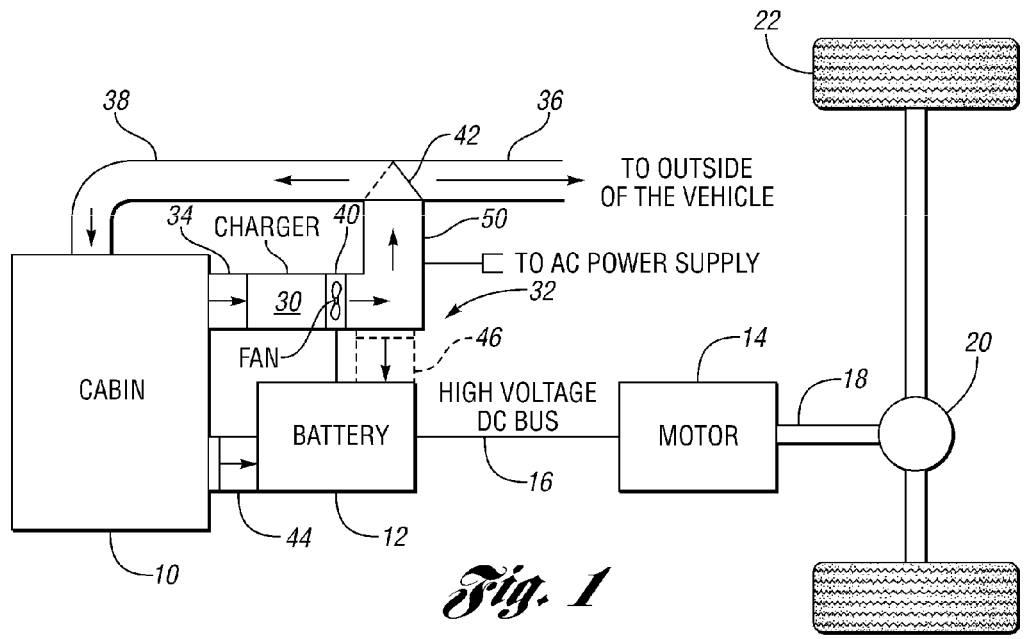
FIG. 1 is a schematic representation of a battery electric vehicle system configuration, including a system for heating the vehicle cabin during preconditioning in an embodiment of the invention.

A schematic representation of a battery electric vehicle system configuration is shown in FIG. 1. The vehicle includes cabin 10, high voltage traction battery 12, and electric motor 14. The battery 12 is connected to the electric motor 14 by a high voltage bus 16. Electric motor 14 drives output shaft 18 which is drivably connected through a differential and axle mechanism 20 to wheels 22. The electric motor 14 may be operated in a variety of ways as is appreciated by those skilled in the art. In general, a vehicle system controller (VSC) (not shown) calculates the required motor output, and controls electric motor 14 in an appropriate fashion.

A charger 30 is connected to the battery 12 and converts alternating current (AC) to high voltage direct current (DC) to charge the battery 12 when the charger 30 is plugged into an alternating current (AC) power supply, which may be a standard household or industrial power supply.

When the vehicle is plugged in to the external power supply and is operating to charge the battery 12, the charger 30 converts AC to DC and due to electrical inefficiencies generates heat. A forced air system 32 includes an air inlet duct 34, a first air outlet duct 36 directing exhaust air to the vehicle extractors and outside of the vehicle, and a second air outlet duct 38 directing exhaust air to the inside of the cabin 10 to warm the cabin during charging for preconditioning purposes. A fan 40 blows air through the various ducts. A valve 42 controls the direction of air flow through the first air outlet duct 36 and the second air outlet duct 38. The forced air system is arranged such that forced air flows through the air inlet duct 34, flows through and removes heat from the charger 30, flows through exhaust duct 50 and flows through at least one of the first air outlet duct 36 and the second air outlet duct 38. In the illustrated arrangement, the valve 42 is arranged to selectively flow forced air through a selected one of the first air outlet duct 36 and the second air outlet duct 38.

As shown in FIG. 1, the air inlet duct 34 is located to direct cooling air from the cabin 10 to the fan 40 and charger 30. It is appreciated that other variations are possible. As discussed above, valve 42 directs the warm charger exhaust air in numerous directions. Warm charger exhaust air may also be directed into the battery 12 to heat the cells and overcome some of the efficiency issues associated with cold battery cells. For example, a battery fan could draw warm air from the cabin 10 through duct 44. In the alternative, warm air could be ducted directly from duct 50 into the battery area through duct 46.

Figure 2:
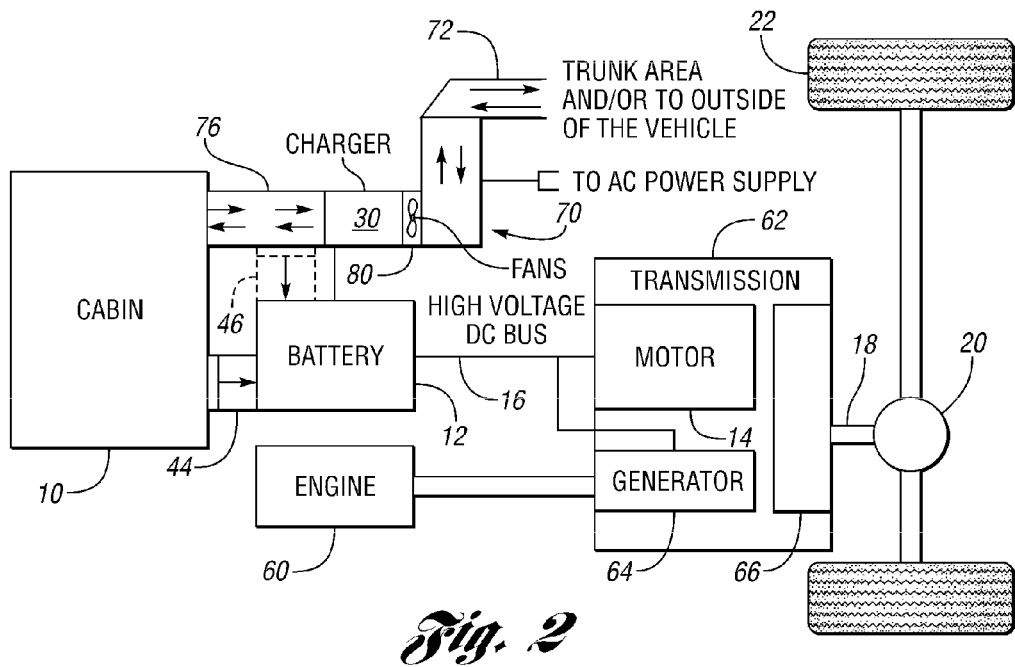
FIG. 2 is a schematic representation of a plug-in hybrid electric vehicle system configuration, including a system for heating the vehicle cabin during preconditioning in an alternative embodiment of the invention.

A schematic representation of a plug-in hybrid electric vehicle system configuration is shown in FIG. 2. The vehicle includes cabin 10, and high voltage traction battery 12 connected to electric motor 14 by high voltage bus 16. An internal combustion engine 60 provides torque to transmission 62. Generator 64 is connected electrically to the battery 12 and to the motor 14 in a known fashion. Transmission 62 includes a gear arrangement 66 and provides torque to output shaft 18 in a known manner.

The engine 60, electric motor 14, and generator 64 may be operated in a variety of ways as is appreciated by those skilled in the art. In general, the vehicle system controller (VSC) (not shown) calculates the total engine power needed to meet the drive wheel power demand plus all accessory loads, and independently schedules the engine speed and load operating point.

The hybrid electric vehicle system configuration is for a plug-in vehicle. The charger 30 connected to the battery 12 converts alternating current (AC) to high voltage direct current (DC) to charge the battery 12 when the charger 30 is plugged into an alternating current (AC) power supply, which may be a standard household or industrial power supply. A forced air system 70 includes a first air duct 72 providing flow communication between the trunk area and/or body extractors and the charger 30, and a second air duct 76 providing flow communication between the charger 30 and the inside of the cabin 10.

A fan 80 blows air through the various ducts. The forced air system is arranged such that when operating in a first mode, air flows from the trunk area through the first air duct 72, removes heat from the charger 30, and flows to the inside of the cabin 10 through the second air duct 76. In a second mode of operation, fan 80 flows air from the inside of the cabin 10 through the second air duct 76, removes heat from the charger 30, and flows to the body extractors and out of the vehicle through the first air duct 72. In the illustrated arrangement, a pair of fans or a reversible fan is arranged to selectively flow air in one direction or the other direction to implement the first and second modes of operation.

As shown in FIG. 2, warm charger exhaust air may also be directed into the battery 12 to heat the cells and overcome some of the efficiency issues associated with cold battery cells. For example, a battery fan could draw warm air from the cabin 10 through duct 44. In the alternative, warm air could be ducted directly into the battery area at duct 46.

It is appreciated that embodiments of the invention may take various forms, and FIGS. 1 and 2 show examples. The charger and forced air system components arrangement illustrated in FIG. 1 in a battery electric vehicle system configuration could also be used in a plug-in hybrid electric vehicle system configuration. Similarly, the charger and forced air system components arrangement illustrated in FIG. 2 in a plug-in hybrid electric vehicle system configuration could also be used in a battery electric vehicle system configuration. Put another way, embodiments of the invention are not limited to particular powertrain implementations.

Figure 3:
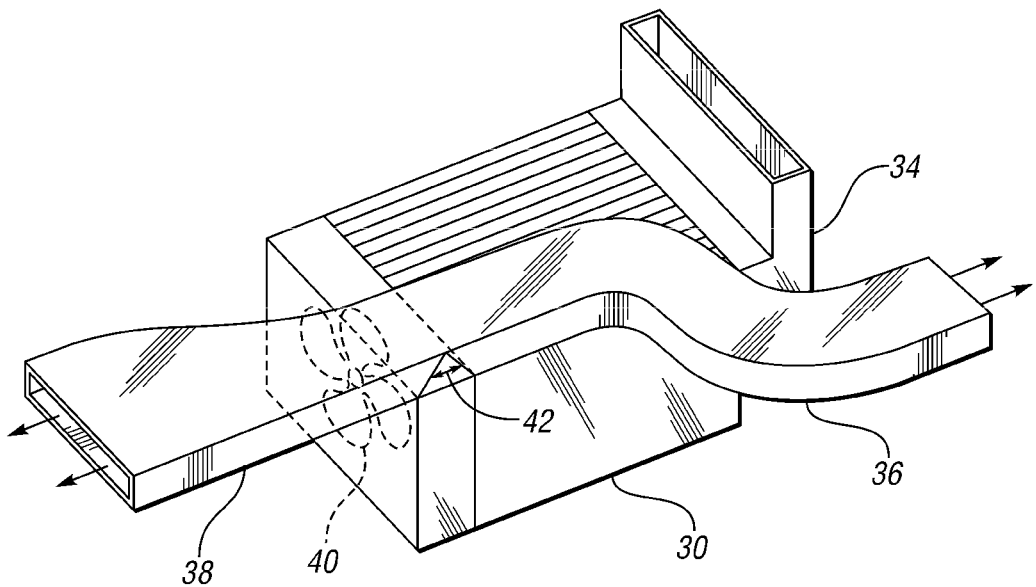
FIG. 3 illustrates a charger and forced air system components in an embodiment of the invention.

FIG. 3 illustrates a charger 30 and forced air system components in an embodiment of the invention. In more detail, FIG. 3 shows air inlet duct 34, first air outlet duct 36 directing exhaust air to the body extractors and outside of the vehicle, and second air outlet duct 38 directing exhaust air to the inside of the cabin (or to the battery cells). Fan 40 blows air through the various ducts; valve 42 controls air flow through the first air outlet duct 36 and the second air outlet duct 38.

Figure 4:
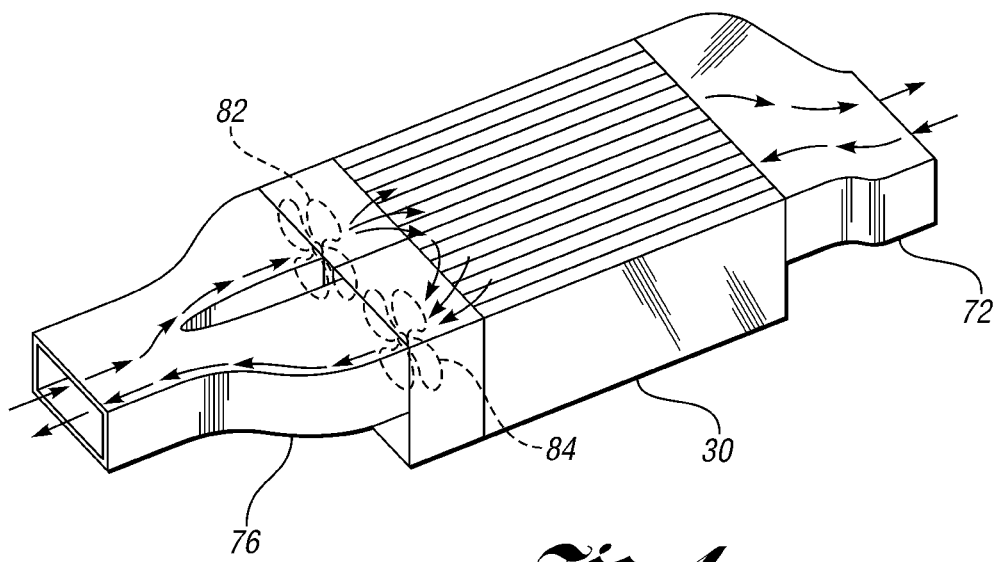
FIG. 4 illustrates a charger and forced air system components in an alternative embodiment of the invention.

FIG. 4 illustrates a charger 30 and forced air system components in an alternative embodiment of the invention. In more detail, FIG. 4 shows first air duct 72 providing flow communication between the trunk area and the charger 30, and second air duct 76 providing flow communication between the charger 30 and the inside of the cabin. The blower arrangement includes first fan 82 and second fan 84. Fan 84 draws air from the trunk and exhausts to the cabin (winter mode). Fan 82 draws air from the cabin and exhausts to the extractor and outside the vehicle (summer mode). The ducting 76 to the cabin could have a door/flap or optimized design to direct air.

Figure 5:
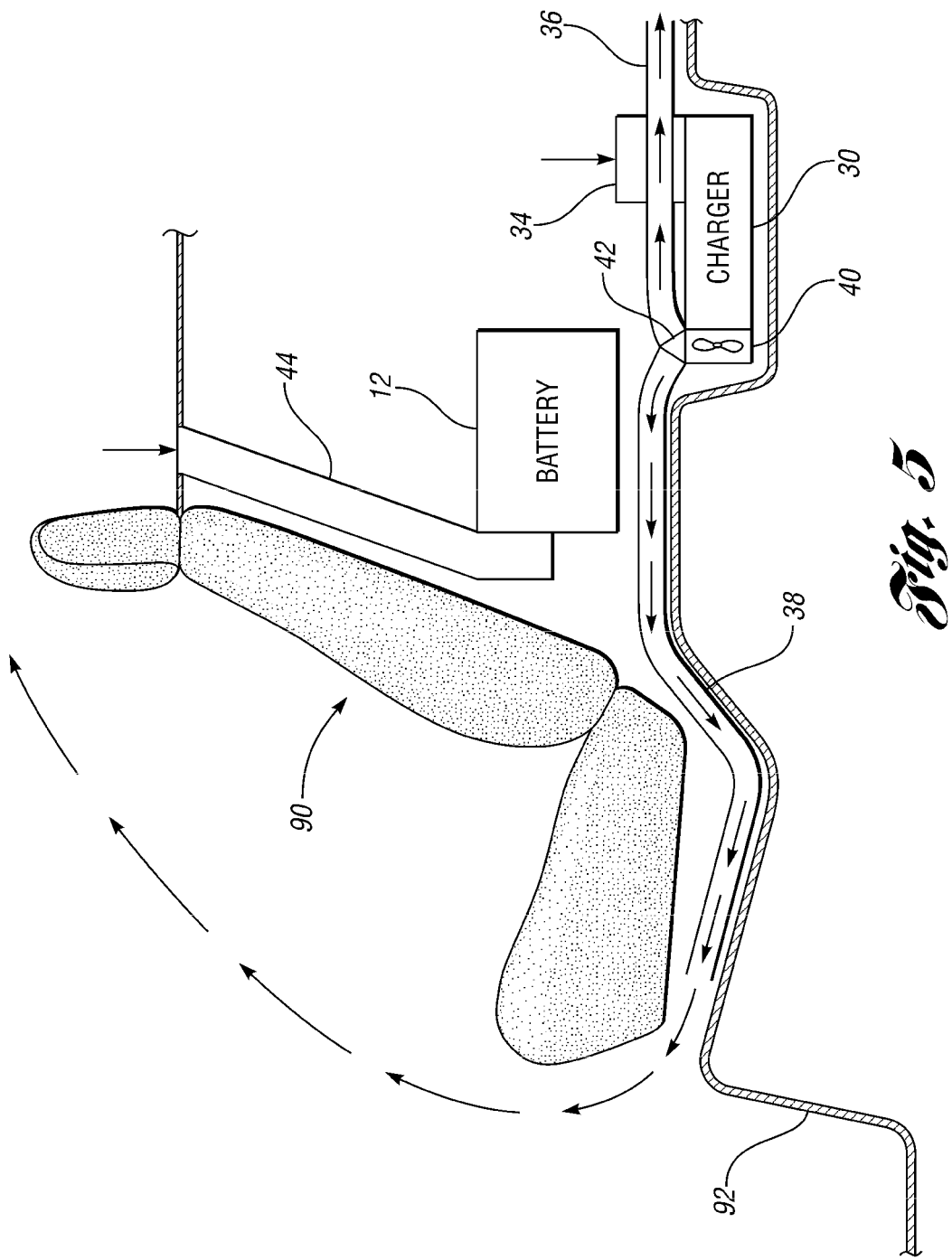
FIG. 5 illustrates a vehicle interior, showing the rear floor and seat, and showing the traction battery, charger, and forced air system components in an embodiment of the invention.

FIG. 5 illustrates a vehicle interior, showing the rear seat 90 and rear floor 92. FIG. 5 further depicts the traction battery 12 and the charger 30 located behind the vehicle seat 90. Air inlet duct 34 is located to direct cooling air from the trunk to the charger 30. First air outlet duct 36 directs exhaust air to the extractors. Second air outlet duct 38 directs exhaust air to the inside of the cabin. Fan 40 blows air through the various ducts; valve 42 controls air flow. Warm charger exhaust air may also be directed into the battery 12 to heat the cells and overcome some of the efficiency issues associated with cold battery cells. A battery fan (not shown) draws air warmed from mixing with the charger exhaust air from the cabin through duct 44. In general, during operation of charger 30, warm air from charger 30 mixes with cold cabin air and rises. The battery fan may pull air in from a high location (warmer air) to warm battery cells.

It is appreciated that embodiments of the invention may take various forms. The specification discusses in depth air cooled chargers; however, embodiments of the invention may be employed with liquid cooled chargers. In such embodiments, there would be a different cooling setup, with the air removing heat by flowing over fins on cooling lines. The waste air could provide heat to the cabin or high voltage battery cells.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A vehicle including a cabin and trunk, the vehicle comprising:
   a high voltage fraction battery;
   an electric motor powered by the traction battery;
   a charger connected to the traction battery for converting alternating current (AC) to high voltage direct current (DC) to charge the traction battery when the charger is plugged into an alternating current (AC) power supply;
   a forced air system including a first air duct providing flow communication between the trunk and the charger, a second air duct providing flow communication between the charger and the inside of the cabin, and a fan arrangement; and
   the forced air system being arranged such that when operating in a first mode, air flows from the outside of the cabin through the first air duct, removes heat from the charger, and flows to the inside of the cabin through the second air duct, and when operating in the second mode, air flows from the inside of the cabin through the second air duct, removes heat from the charger, and flows to the outside of the cabin through the first air duct.

2. The vehicle of claim 1 wherein the vehicle further comprises:
   an internal combustion engine; and
   a hybrid electric powertrain including the electric motor powered by the traction battery and further including an electric generator coupled to the internal combustion engine and the traction battery.

3. The vehicle of claim 1 wherein the forced air system further includes a battery inlet duct located to direct warm cabin air after mixing with warm charger air from the inside of the cabin to the traction battery for warming the traction battery cells.

4. The vehicle of claim 1 wherein the forced air system further includes a charger exhaust duct located to direct exhaust air from the charger directly to the traction battery for warming the fraction battery cells.

5. The vehicle of claim 1 further comprising:
   a vehicle seat; and
   wherein the traction battery and the charger are located, within the vehicle, behind the vehicle seat.

6. The vehicle of claim 1 wherein the fan arrangement includes a first fan positioned to provide air flow from the trunk through the first air duct and to the inside of the cabin through the second air duct, and a second fan positioned to provide air flow from the inside of the cabin through the second air duct.

\* \* \* \* \*